United States Patent Office 3,525,218
Patented Aug. 25, 1970

3,525,218
ECONOMIC ENERGY RECOVERY FROM AVAILABLE FEED GAS LINE PRESSURE
John R. Buss, St. Louis, Mo., assignor to Monsanto Company, St. Louis, Mo., a corporation of Delaware
Filed Dec. 26, 1968, Ser. No. 787,037
Int. Cl. F02c 3/22
U.S. Cl. 60—39.02                                      6 Claims

ABSTRACT OF THE DISCLOSURE

The disclosure teaches the recovery of energy from gaseous combustible substances which are available under pressure, by combustion under pressure of a small part of the gaseous substance, with the products of combustion being admixed with the remainder of the gaseous substance.

---

The present invention relates to the recovery of useful energy, or the production of useful power, by utilization of the initial pressure of gaseous fuels or other combustible gases. It is an object of the invention to improve the thermodynamic efficiency of the combustion cycle based upon the use of gaseous fuels, which are available under pressure. It is also an object of the invention to obtain energy by the partial combustion of a gaseous fuel in a power production cycle in which the major combustion of the fuel takes place in the boiler combustion section of the power production cycle.

It is also an object of the invention to produce useful energy in the form of shaft horsepower, or electrical energy, by the heat added by burning a small amount of a gaseous material to produce shaft horsepower, or electrical energy, in reducing the initial delivery pressure of the gaseous supply to the pressure required for ultimate use of the gaseous material, provided that the increase of the resultant carbon dioxide (or carbon monoxide or oxygen) and nitrogen and water vapor will not be detrimental to the ultimate use of said gaseous material.

The conventional operation of power production cycles in which a gaseous fuel is burned in one or more boilers is conducted by first letting down the pressure of the gaseous fuel from its normal line pressure, customarily in the range of from 50 to 1,000 lbs. per square inch absolute. As a result of such expansion through a letdown valve, the gas is available at a moderate pressure, for example 25 to 50 lbs. per square inch absolute. However, as is shown below, such a simple expansion and combustion cycle can be considerably improved in efficiency in accordance with the practice of the present invention.

Figure 1:
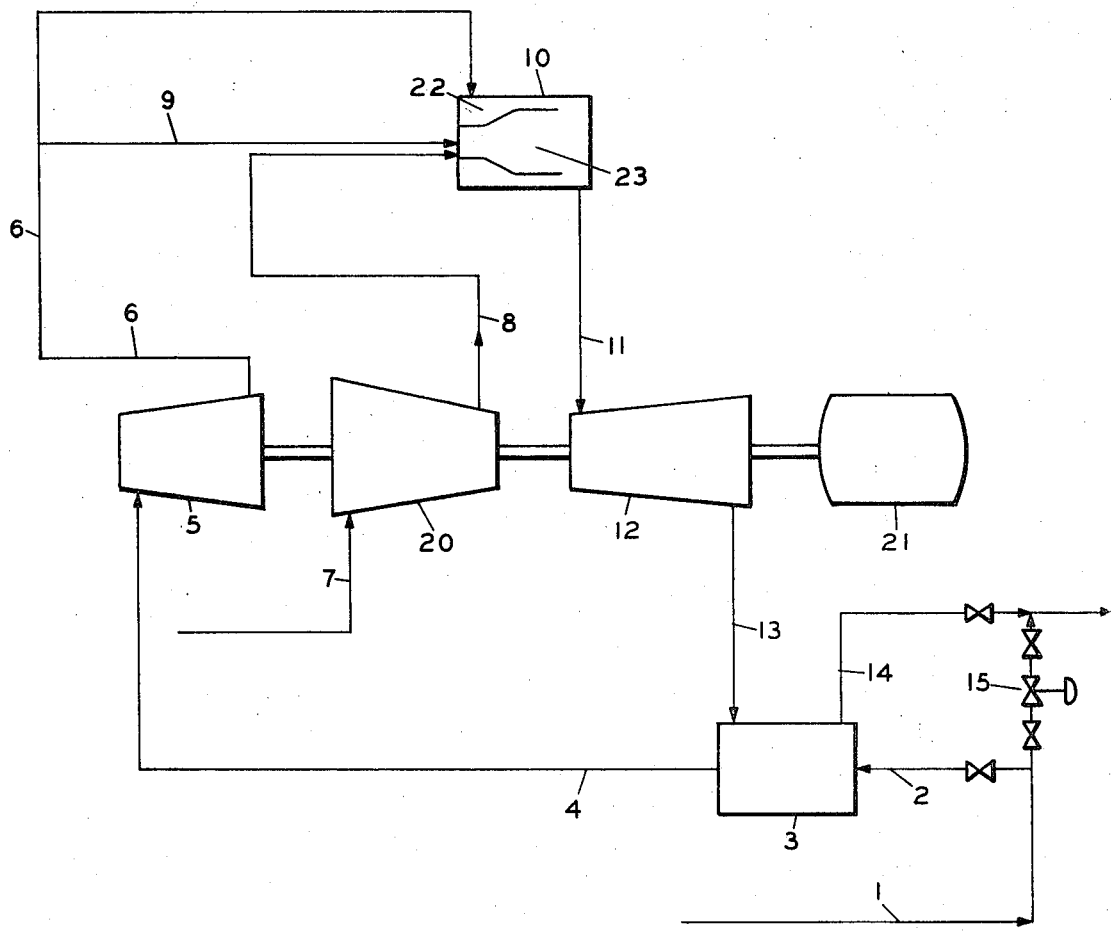
Figure 2:
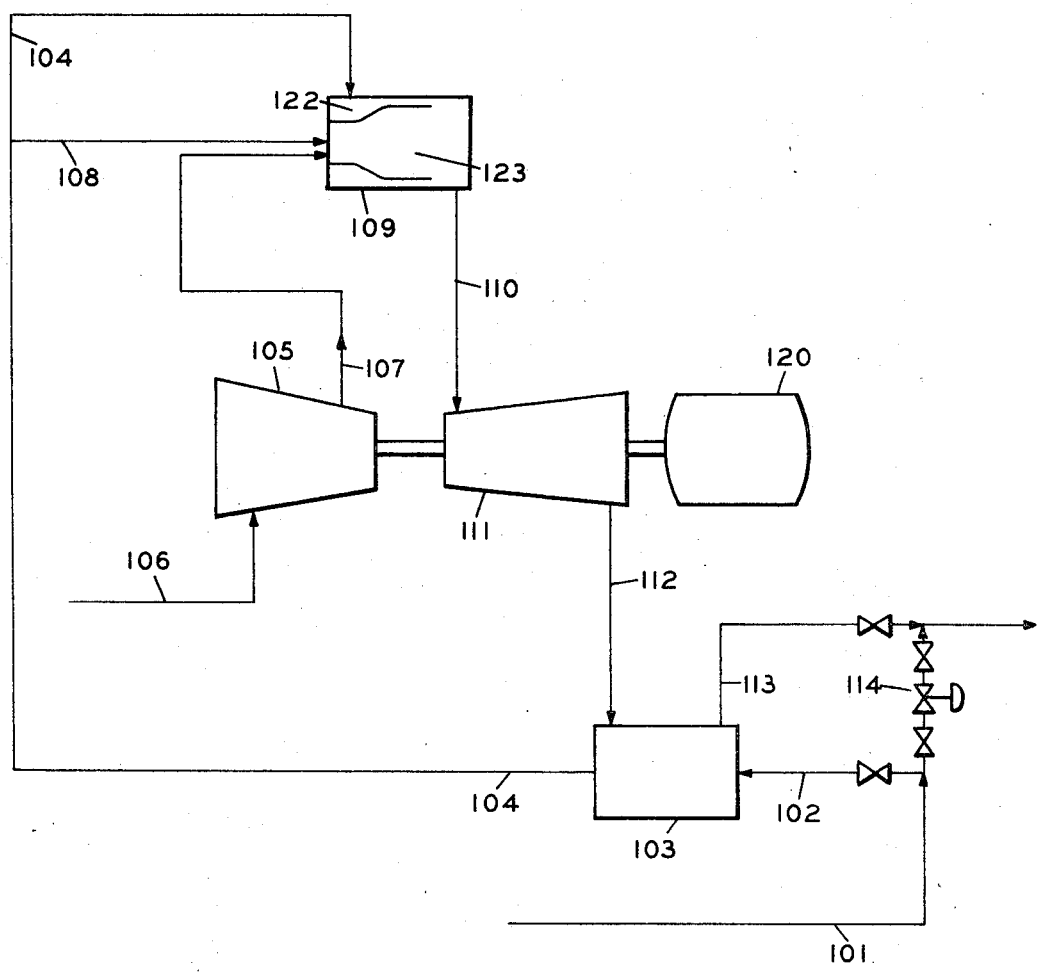

The present invention is carried out by expanding all or a portion of the gaseous material, through one or more expansion turbines with the direct production of energy, either as shaft horsepower or as a direct output of electrical energy. The combustible gaseous substance is employed at an initial pressure of at least 50 lbs. per square inch gage, a preferred range being from 50 to 5,000 p.s.i.g. or more, preferably 50 to 1,500 p.s.i.g. In carrying out the invention, the high pressure incoming gas stream is first heated, such as by indirect heat exchange. A split is then made of the heated gas with only a portion, preferably from 1% to 50% by volume, being admixed with a compressed oxygen-containing gas for combustion in a pressure combustion chamber. The combusted gas stream is then admixed with the remainder of the fuel gas stream. Thus, an additional feature of the invention is that only a minor proportion of the fuel gas stream is subjected to combustion under pressure conditions with oxygen, e.g., from air, pure oxygen, or an enriched oxygen stream utilized in approximately stoichiometric proportion with the fuel to be combusted, whereby the partially combusted fuel gas stream achieves a higher temperature in entering the expansion turbine so that a greater output of energy is achieved. For example, as described above, the fuel gas may also receive heat energy preceding a turbine expansion by employing indirect heat exchange, for example, by exchange with the expanded fuel gas stream leaving a combustion turbine. The temperature of the incoming gas stream may be heated to any economical value by such indirect heat exchange. The final gas stream leaving the present expansion cycle through one or more turbines, preferably at a temperature of 500° F. to 2,000° F. then passes to one or more boilers for combustion, utilizing the proper amount of air or other oxygen-containing gas to obtain the maximum efficiency in such boiler combustion or for other operations. The expansion of the heated portion of the fuel gas results in an exit pressure of from 10 to 1,000 lbs. per square inch gage. The drawings of the present invention show several ways of carrynig out the invention. FIG. 1 shows a dual turbine expansion system, while FIG. 2 illustrates a single turbine installation.

The following examples illustrate specific embodiments of the invention, but are not limitative of the scope of the invention:

EXAMPLE 1

This example shows the use of the present process employing two expansions of the combustion gas streams through two turbines. In this example, as shown in FIG. 1, the incoming stream of natural gas enters via line 1 and line 2 at 600 lbs. per square inch gage and at 60° F. with a flow rate of 47,400 lbs. per hour, corresponding to 1,000,000 (also written as 1$\overline{M}$) cubic feet per hour at standard values of pressure and temperature. This gas enters a heat exchanger 3 through line 2. In heat exchanger 3 this steram of gas is heated by indirect contact to a temperature of 900° F. and is passed through line 4 to expander turbine 5 and is discharged through line 6 at a pressure of 255 p.s.i.g. and a temperature of 778° F.

Atmospheric air is introduced into compressor 20 through line 7 and compressed at 255 p.s.i.g. and is discharged at a temperature of 510° F. through line 8. A small quantity of the gas stream from line 6, namely, 1,400 lbs./hr., is passed through line 9 into the main combustion chamber of combustion chamber 10, together with the air from line 8, namely, 22,300 lbs./hr., which is the stoichiometric quantity of air required to burn the 1,400 lbs./hr. of gas.

The remainder of the gas stream from line 6, namely, 46,000 lbs./hr., is introduced through line 6 into the outer part 22 of combustion chamber 10 where it cools the main combustion chamber liner 23 and is mixed with the products of combustion from the main combustion chamber. The mixture of heated gas and the products of combustion leaves the combustion chamber 10 through line 11 at a pressure of 250 p.s.i.g. and a temperature of 1,350° F., and are admitted to the expansion gas turbine 12. The mixture of natural gas and products of combustion are discharged from turbine 12 at a pressure of 20 p.s.i.g. and a temperature of 1,029° F. through line 13 and passed through heat exchanger 3 where they transfer a part of their heat to the incoming cold natural gas, and are discharged at a pressure of 15 p.s.i.g. and a temperature of 403° F. through line 14 to the boiler plant fuel system, or other fuel requiring apparatus. Bypass line 15 provides for the direct admixture of incoming fuel gas to line 14.

The gross horsepower output of the two expander turbines 5 and 12 is 8,575 HP, which shaft horsepower energy is transmitted to generator 21. The operation of the air compressor 20 requires 1,075 HP whether direct connected to the turbine shafts or separately driven. This leaves a net available output of 7,500 HP or the equivalent of 5,300 kw.

EXAMPLE 2

This example shows the use of a single expansion turbine system in carrying out the process of the invention as shown in the embodiment of FIG. 2. The incoming natural gas stream (having the same analysis as that of Example 1) enters via line 101 and line 102 at 600 lbs. per square inch gage and at 60° F. with a flow rate of 47,500 lbs. per hour (corresponding to the boiler fuel value of 1$\overline{M}$ cubic feet per hour at standard values of pressure and temperature, if supplied directly to a boiler plant). This gas enters heat exchanger 103 through line 102. In heat exchanger 103 this stream of gas is heated by indirect contact to a temperature of 955° F. and is discharged through line 104.

Atmospheric air is introduced into compressor 105 through line 106 and compressed to 595 p.s.i.g. and is discharged at a temperature of 430° F. through line 107. A small quantity of the gas stream from line 104, namely, 1,500 lbs. per hour, is passed through line 108 into the main combustion chamber 123 of combustion chamber 109, together with the air from line 107, namely, 24,000 lbs. per hour, which is the stoichiometric quantity of air required to burn the 1,500 lbs. per hour of gas.

The remainder of the gas stream from line 104, namely, 46,000 lbs. per hour, is introduced through line 104 into the outer part 122 of combustion chamber 109 where it cools the main combustion chamber liner and is mixed with the products of combustion from the main combustion chamber. The mixture of heated gas and the products of combustion leave the combustion chamber 109 through line 110 at a pressure of 590 p.s.i.g. and a temperature of 1,500° F. and are admitted into the expansion gas turbine 111. The mixture of natural gas and products of combustion are discharged from turbine 111 at a pressure of 20 p.s.i.g. and a temperature of 1,055° F. through line 112 and passed through heat exchanger 103 where they transfer a part of their heat to the incoming cold natural gas and are discharged at a pressure of 15 p.s.i.g. and a temperature of 405° F. through line 113 to the boiler plant fuel system. Bypass line 114 provides for the direct admixture of incoming fuel gas to line 113.

The gross horsepower output of the expander turbine 111 is 9,750 HP, which is transmitted to generator 120. The operation of the air compressor 105 requires 1,750 HP whether direct connected to the turbine shaft or separately driven. This leaves a net available output of 8,000 HP or the equivalent of 5,700 kw.

The present invention is applicable to the combustion of gaseous combustible substances generally. Preferred examples are hydrocarbon gases, including natural gases and refinery fuel streams, including hydrogen-rich gas mixtures. Natural gas, regardless of source, normally contains approximately 95% methane ($CH_4$) and varying small quantities of higher hydrocarbons, some carbon monoxide, and nitrogen. The calculations in these two examples are based upon the thermodynamic properties of methane, as is the composition of the final fuel gas supplied to the boiler plant fuel system, e.g., 76.9% by vol. $CH_4$, 16.53% $N_2$, 2.27% $CO_2$, 4.3% $H_2O$, and with a gross heating value of the total gas mixture to the boilers of 766 B.t.u./s.c.f.

The above examples show how the pressure energy of the incoming fuel gas may be put to profitable use, in contradistinction to the prior art practice of merely throttling down the high pressure feed gas without gaining any advantage.

What is claimed is:

1. In a process for the production of energy, a method for the recovery of energy from available feed gas line pressure which comprises introducing the said fuel gas stream at a pressure of from 50 to 1,500 lbs. per square inch into a heating zone, combusting a small portion of gaseous fuel in said heating zone to raise the temperature of the said fuel gas to a temperature of from 500° F. to 2,000° F., expanding the said heated gas through an expansion turbine to an exit pressure of from 10 to 500 lbs. per square inch gage, and thereafter admixing the said fuel gas at an elevated temperature with an oxygen-containing gas and burning the said mixture in a boiler or other fuel-requiring apparatus.

2. In a process for the production of energy, a method for the recovery of energy from available feed gas line pressure comprising introducing a gaseous substance at a pressure of from 50 to 5,000 lbs. per square inch into a heating zone, combusting a small portion of a gaseous combustible substance in said heating zone to raise the temperature of the said gaseous substance to a temperature of from 500° F. to 2,000° F., expanding the said heated gaseous substance through an expansion turbine to an exit pressure of from 10 to 1,000 lbs. per square inch pressure.

3. In a process for the production of energy as shaft horsepower by the processing of a stream of a gaseous combustible substance at a pressure of at least 50 lbs. per square inch, a method for the recovery of energy from available pressure of the stream which method comprises introducing from 1% to 50% by volume of the said substance together with the approximately stoichiometric portion of an oxygen-containing gas, combusting the said mixture, admixing the resultant products of combustion with the remainder of the said gaseous combustible substance, to achieve a temperature of from 500° F. to 2,000° F., and expanding the said gas mixture through an expansion turbine to an exit pressure of from 10 to 1,000 lbs. per square inch gage.

4. In a process for the production of energy from a gaseous combustible substance at a pressure of at least 50 lbs. per square inch, a method for the recovery of energy from available pressure of the stream, which method comprises introducing a portion of the said gaseous substance together with the approximately stoichiometric portion of an oxygen-containing gas, combusting the said mixture, admixing the resultant products of combustion with the remainder of the said gaseous substance to achieve a temperature of from 500° F. to 2,000° F., expanding the gas mixture through an expansion turbine to an exit pressure of from 10 to 500 lbs. per square inch gage, and burning the said preheated mixture in a boiler or other fuel-requiring apparatus.

5. In a process for the production of energy from a gaseous fuel at a pressure of from 50 to 5,000 lbs. per square inch, a method for the recovery of energy from available gaseous fuel pressure, which method comprises admixing a portion of the said gaseous fuel with the approximately stoichiometric portion of an oxygen-containing gas, combusting the resultant admixture in a combustion zone, mixing the combustion products with the remaining uncombusted gaseous fuel to achieve a temterature of from 500° F. to 2,000° F., and thereafter expanding the resultant mixture through an expansion turbine to an exit pressure of from 10 to 500 lbs. per square inch gage.

6. In a process for the production of energy from a fuel gas stream at a pressure of from 50 to 5,000 lbs. per square inch, a method for the recovery of energy from available fuel gas stream pressure, which method comprises introducing the said gaseous fuel into an indirect heating zone, raising the temperature of the said fuel gas, admixing a portion of the said heated gas with approximately the stoichiometric portion of an oxygen-containing gas, combusting the resultant admixture in a combustion zone, admixing the resultant products of combustion with the remainder of the fuel to achieve a temperature of the mixture of from 500° F. to 2,000° F., expanding the said mixture through an expansion turbine to an exit pressure of from 10 to 1,000 lbs. per square inch gage, and thereafter passing the heated expanded gas mixture as the heat source through the said indirect heating zone.

References Cited

UNITED STATES PATENTS

| | | | |
|---|---|---|---|
| 2,592,749 | 4/1952 | Sedille et al. | 60—39.12 |
| 2,660,032 | 11/1953 | Rosenthal | 60—39.02 |
| 2,675,672 | 4/1954 | Schorner | 60—39.12 |
| 3,107,482 | 10/1963 | Fono. | |

CARLTON R. CROYLE, Primary Examiner

U.S. Cl. X.R.

60—39.46, 39.51, 36, 39.18, 38; 122—1